United States Patent
Czapla et al.

(10) Patent No.: US 12,448,138 B2
(45) Date of Patent: Oct. 21, 2025

(54) DEVICE FOR COUPLING A PROPULSION SYSTEM TO AN ENGINE PYLON OF AN AIRCRACT, AND CORRESPONDING AIRCRAFT

(71) Applicant: Airbus Operations SAS, Toulouse (FR)

(72) Inventors: Lionel Czapla, Toulouse (FR); Kotaro Fukasaku, Toulouse (FR); Rémi Amargier, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/742,394

(22) Filed: Jun. 13, 2024

(65) Prior Publication Data
US 2024/0417091 A1    Dec. 19, 2024

(30) Foreign Application Priority Data

Jun. 16, 2023   (FR) ...................................... 2306199

(51) Int. Cl.
*B64D 27/40*   (2024.01)

(52) U.S. Cl.
CPC .................. *B64D 27/406* (2024.01)

(58) Field of Classification Search
CPC ..... B64D 27/406; B64D 27/40; B64D 27/404
See application file for complete search history.

(56) References Cited

U.S. PATENT DOCUMENTS

| | | | | |
|---|---|---|---|---|
| 4,717,094 A | * | 1/1988 | Chee | B64D 27/404 244/54 |
| 4,943,013 A | * | 7/1990 | Kapala | F16C 11/045 244/54 |
| 5,927,644 A | * | 7/1999 | Ellis | F02C 7/20 60/797 |
| 2011/0266389 A1 | * | 11/2011 | Combes | B64D 27/402 244/54 |
| 2021/0003037 A1 | * | 1/2021 | Banhos | F01D 25/28 |
| 2024/0417090 A1 | * | 12/2024 | Czapla | B64D 27/402 |

OTHER PUBLICATIONS

French Search Report for corresponding French Patent Application No. 2306199 dated Dec. 8, 2023.

* cited by examiner

*Primary Examiner* — Justin M Benedik
(74) *Attorney, Agent, or Firm* — Greer, Burns & Crain, Ltd.

(57) ABSTRACT

A device for coupling a propulsion system to an engine pylon of an aircraft, the device comprising a baseplate comprising a base suitable for being fastened to the propulsion system, and a first wall extending substantially perpendicularly to the base. The first wall of the baseplate interacts with first and second sleeves, a pair of flanges and a fasteners to the engine pylon. The fasteners comprise two adjacent fastening screws extending parallel to each other.

8 Claims, 6 Drawing Sheets

(PRIOR ART)

DEVICE FOR COUPLING A PROPULSION SYSTEM TO AN ENGINE PYLON OF AN AIRCRACT, AND CORRESPONDING AIRCRAFT

CROSS-REFERENCES TO RELATED APPLICATIONS

This application claims the benefit of French Patent Application Number 2306199 filed on Jun. 16, 2023, the entire disclosure of which is incorporated herein by way of reference.

FIELD OF THE INVENTION

The present invention relates to a device for coupling a propulsion system to the wing of an aircraft. More specifically, the invention relates to a device for coupling a propulsion system to the engine pylon of the aircraft, and to an aircraft comprising a propulsion system and at least one such device for coupling the propulsion system to the engine pylon.

BACKGROUND OF THE INVENTION

Usually, for an aircraft, a propulsion unit comprises for example a turbojet engine that is fastened to a wing of the aircraft using an engine pylon. The engine pylon generally consists of a structure comprising a plurality of tubes fastened to ribs.

The turbojet engine is fastened to the ribs of the engine pylon by means of engine mounts that conventionally comprise a plurality of front engine mounts at the front, and a plurality of rear engine mounts at the rear. Generally, the turbojet engine is fastened by its gearbox at the front, and by the body of the turbojet engine at the rear.

FIG. 2 illustrates an example of a prior art mount 9 for coupling a turbojet engine T to the engine pylon M of an aircraft. The mount 9 comprises a baseplate 90 in the shape of an inverted T, comprising a base 900 from which a wall 902 extends substantially (i.e., +/−10%) perpendicularly. The base 900 has a generally quadrilateral shape and is suitable for being in contact with the turbojet engine T and fastened to the turbojet engine T, for example using threaded elements (on the gearbox for the front mount and on the body of the turbojet engine for the rear mount, for example).

The wall 902 comprises a bore in which a sleeve (not shown) is housed, which itself has a bore through which is fitted a fastening pin 91 that is fastened to the engine pylon M, for example by screwing. The mount 9 further comprises shock absorbing pads 92 implemented on either side of the wall 902 of the baseplate 90 and held by a set of flanges 93 in order to partially absorb the forces generated by the turbojet engine. A mount 9 implementing pads 92 is also referred to as a flexible mount. A spacer 94 can also be implemented, around part of the sleeve, between the mount 9 and the engine pylon M.

Although the current installations are satisfactory in terms of fastening the turbojet engine to the engine pylon, the implementation of these installations requires a plurality of these installations in order to guard against the potential failure of the mount, particularly in the event that the fastening pin 91 breaks or cracks. Having a plurality of these installations leads to excess weight and therefore increased fuel consumption, which is unsatisfactory.

There is therefore a need to provide a solution ensuring optimum, more secure fastening of a turbojet engine to the wing of an aircraft.

SUMMARY OF THE INVENTION

An object of the present invention is to propose a device for coupling a propulsion system to the engine pylon rigidly connected to the wing of an aircraft, this device providing a more secure solution for fastening a propulsion system in the event of the failure of the mount.

To this end, a device is proposed for coupling a propulsion system to an engine pylon of an aircraft, said device comprising:
  a baseplate substantially in the shape of an inverted T, said baseplate comprising a base suitable for being fastened to said propulsion system and a first wall extending substantially perpendicularly to said base, said first wall comprising a first bore and a second bore extending respectively along a first longitudinal axis and a second longitudinal axis that are parallel to each other;
  a first sleeve and a second sleeve that are substantially tubular, each comprising a first portion fitted respectively through said first bore and said second bore, said first and second sleeves each comprising a second portion a first end of which extends in the continuation of said first portion towards said engine pylon and a second end of which is suitable for interacting with said engine pylon, said first sleeve comprising a first central bore coaxial with said first longitudinal axis and said second sleeve comprising a second central bore coaxial with said second longitudinal axis;
  fastening means comprising a first nut and a second nut suitable for being rigidly connected to said engine pylon, a first fastening screw comprising a first fastening head from which extends a first threaded shank, said first threaded shank being fitted through said first central bore and being screwed to said first nut, and a second fastening screw comprising a second fastening head from which extends a second threaded shank, said second threaded shank being fitted through said second central bore and being screwed to said second nut;
  a second front flange and a second rear flange, said second flanges being arranged respectively on either side of said first wall, said second front flange comprising an eleventh bore and a twelfth bore extending respectively coaxially with said first and second longitudinal axes, said second rear flange comprising a thirteenth bore and a fourteenth bore extending respectively coaxially with said first and second longitudinal axes;
  a first spacer and a second spacer suitable for being arranged between said second rear flange and said engine pylon, said first spacer comprising a third central bore coaxial with said first longitudinal axis so that said first spacer is fitted onto said second portion of said first sleeve, and said second spacer comprising a fourth central bore coaxial with said second longitudinal axis so that said second spacer is fitted onto said second portion of said second sleeve.

Said first portion of said first sleeve is fitted through said eleventh and thirteenth bores of said second flanges.

Said first portion of said second sleeve is fitted through said twelfth and fourteenth bores of said second flanges.

Each fastening head bears against said second front flange.

As a result, if one of the first or second fastening screws fails, the other fastening screw ensures that the propulsion system continues to be coupled to the engine pylon. The risk of the complete loss of the device for coupling the propulsion system to the engine pylon is therefore reduced.

According to one particular aspect of the invention, said first longitudinal axis and said second longitudinal axis extend parallel to each other in a plane generally parallel to said base.

According to another particular aspect of the invention, said first longitudinal axis and said second longitudinal axis extend parallel to each other in a plane generally perpendicular to said base.

According to one particular aspect of the invention, said baseplate comprises a first part and a second part of the baseplate, each of said first and second parts being L-shaped, wherein said first part comprises a first base wall from which extends perpendicularly a second wall comprising a fifteenth bore and a sixteenth bore extending respectively coaxially with said first and second longitudinal axes, and said second part comprises a second base wall from which extends perpendicularly a third wall comprising a seventeenth bore and an eighteenth bore extending respectively coaxially with said first and second longitudinal axes.

Said first and second parts of the baseplate are placed against each other so that said second wall and said third wall together form said first wall of said baseplate, said first and second base walls together form said base of said baseplate, and said fifteenth and seventeenth bores together form said first bore and said sixteenth and eighteenth bores together form said second bore.

According to one particular aspect of the invention, the device comprises means for centering said first and second parts of the baseplate relative to each other along said longitudinal axes.

According to another particular aspect of the invention, said centering means comprise a first male cylinder coaxial with said first longitudinal axis and a second male cylinder coaxial with said second longitudinal axis, said first and second male cylinders protruding from a first contact face of said second wall, or of said third wall respectively, and a first cylindrical recess coaxial with said first longitudinal axis and a second cylindrical recess coaxial with said second longitudinal axis for respectively receiving said first male cylinder and second male cylinder, said first and second cylindrical recesses being made in a second contact face of said third wall, or of said second wall respectively, said first and second contact faces being arranged facing each other when said first and second parts of the baseplate are assembled.

According to another particular aspect of the invention, the device also comprises:
- a first front flange and a first rear flange, said first front and rear flanges being fastened respectively on either side of said first wall, said first front flange comprising a third bore and a fourth bore extending respectively coaxially with said first and second longitudinal axes, said first rear flange comprising a fifth bore and a sixth bore extending respectively coaxially with said first and second longitudinal axes; and
- a front pad and a rear pad that are arranged respectively against said first front flange and against said first rear flange, said front pad comprising a seventh bore and an eighth bore extending respectively coaxially with said first and second longitudinal axes, said rear pad comprising a ninth bore and a tenth bore extending respectively coaxially with said first and second longitudinal axes.

According to this aspect of the invention, said first portion of said first sleeve is fitted through said third and fifth bores of said first flanges and through said seventh and ninth bores of said pads, and said first portion of said second sleeve is fitted through said fourth and sixth bores of said first flanges and through said eighth and tenth bores of said pads.

The invention also proposes an aircraft comprising a propulsion system, an engine pylon and at least one device as described above, said propulsion system being coupled to the engine pylon by said at least one device, wherein said baseplate is fastened to said propulsion system, and said first and second nuts are rigidly connected to said engine pylon.

BRIEF DESCRIPTION OF THE DRAWINGS

The aforementioned features of the invention, along with others, will become more apparent on reading the following description of an embodiment and its variants, said description being given with reference to the appended drawings, in which.

DETAILED DESCRIPTION OF THE PREFERRED EMBODIMENTS

Figure 1:
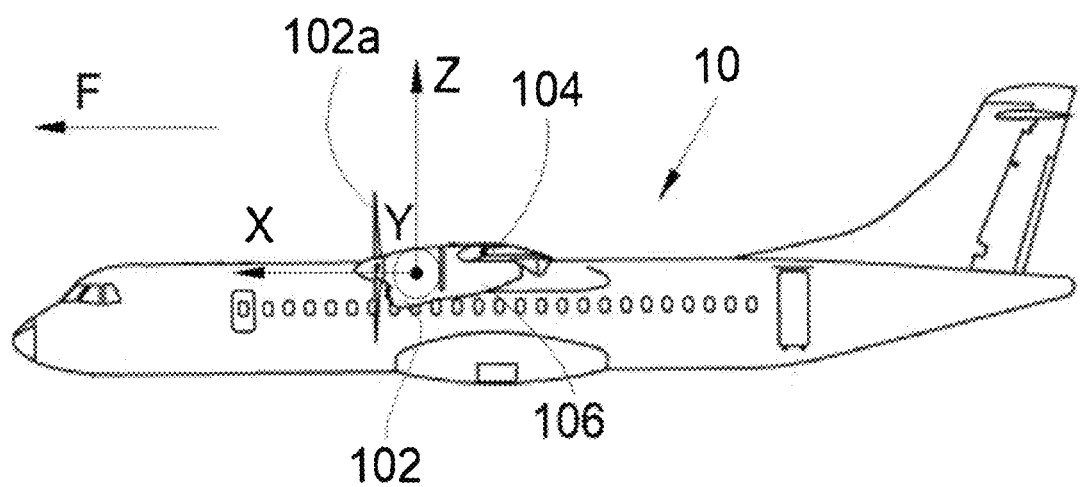
FIG. 1 is a side view of an aircraft according to the invention.
Figure 2:
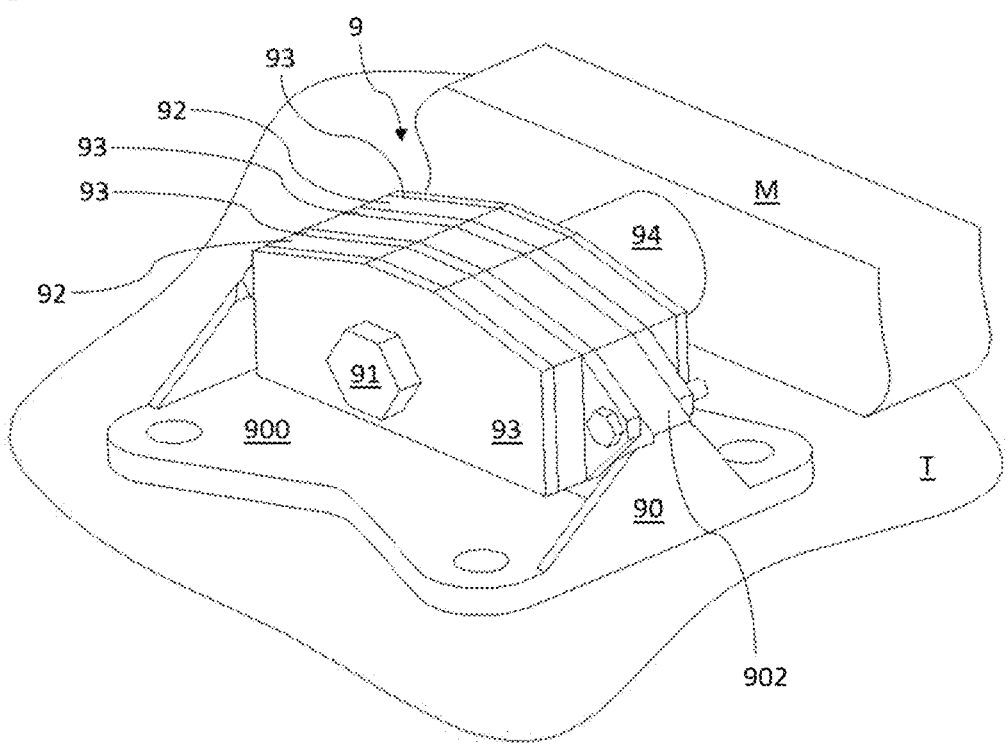
FIG. 2 is a perspective view of a mount according to a prior art solution.

FIG. 1 shows an aircraft 10 that comprises a propulsion system 102, for example a turbojet engine or turboprop engine. The propulsion system 102 is connected to a wing 104 of the aircraft 10 by means of an engine pylon 106.

In the following description, terms relating to a position are given with reference to an aircraft in the normal flight position, that is, as shown in FIG. 1, and the positions "front" and "rear" are given relative to the front and rear of the propulsion system 102 and relative to the direction of travel F of the aircraft 10 when the propulsion system 102 is operating.

In the following description, and by convention, the X direction is the longitudinal direction of the propulsion system, which is horizontal when the aircraft is on the ground, the Y direction is the transverse direction, which is horizontal when the aircraft is on the ground, and the Z direction is the vertical direction, which is vertical when the aircraft is on the ground, these three directions X, Y and Z being mutually orthogonal.

The engine pylon 106 and the propulsion system 102 have a vertical mid-plane XZ and the propulsion system 102 is in this case a turboprop engine with a propeller 102a, but it could be a turbofan engine with a nacelle.

Figure 3:
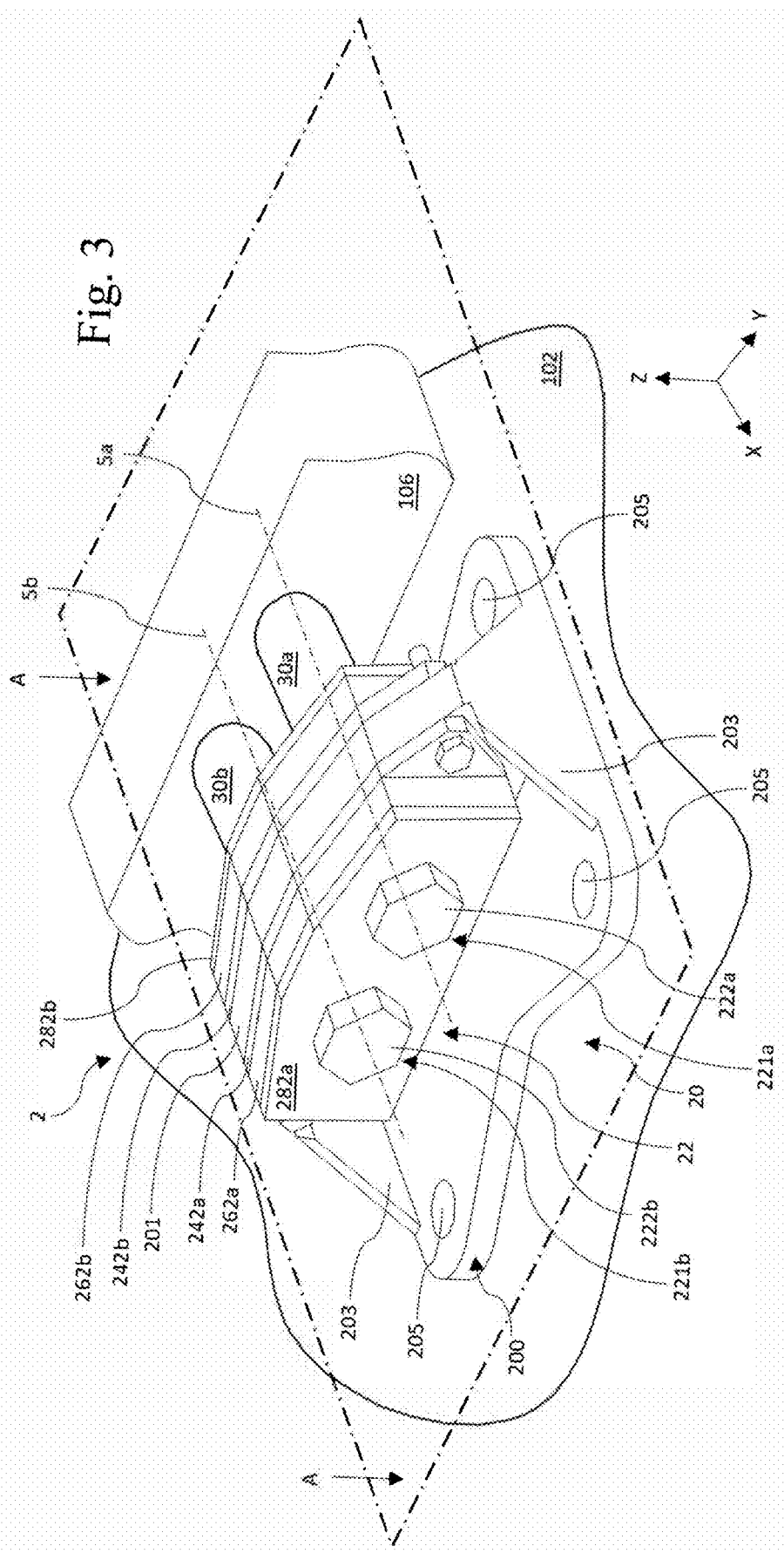
FIG. 3 is a perspective view of a coupling device according to one exemplary embodiment of the invention.
Figure 4:
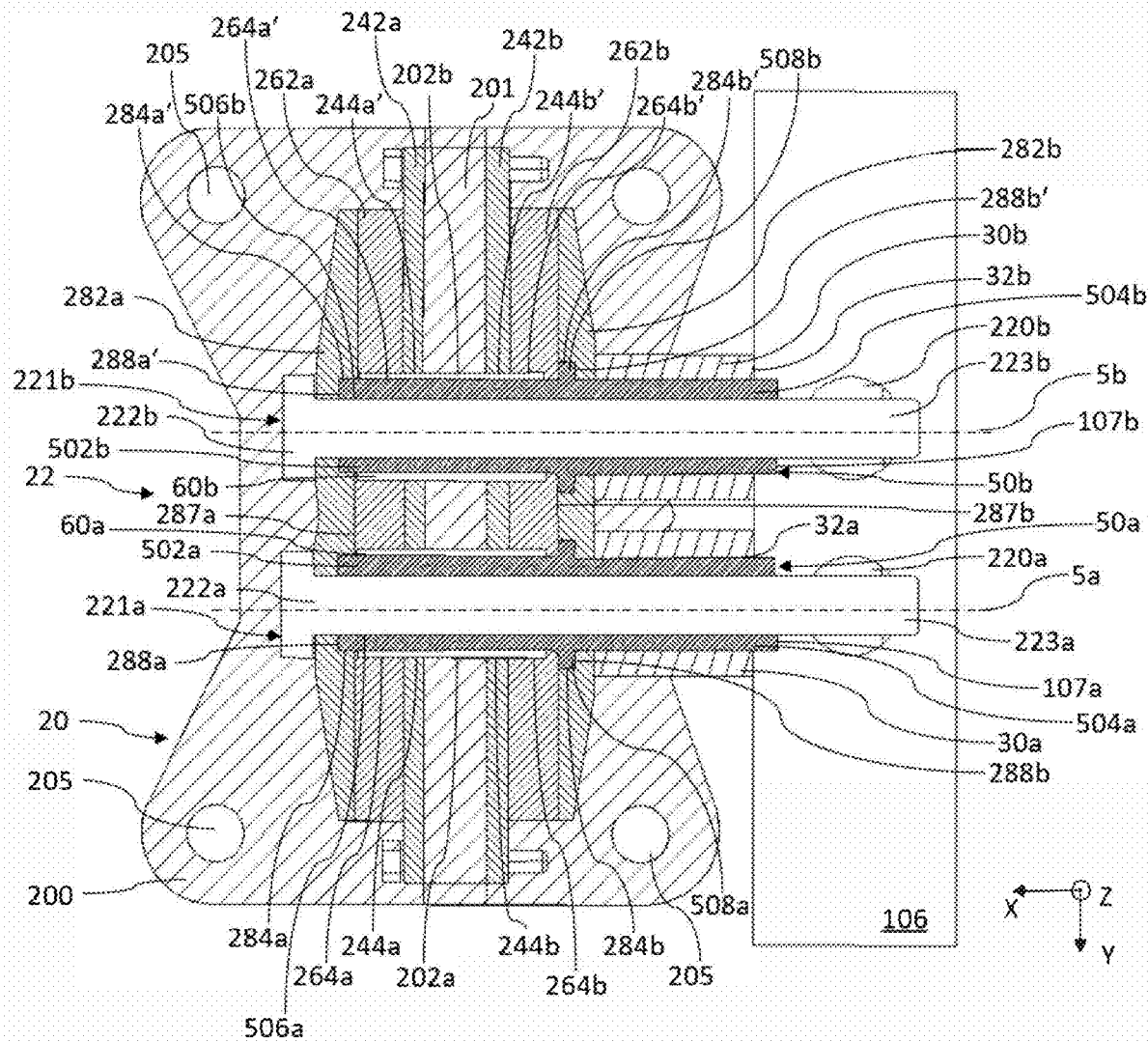
FIG. 4 is a cross-sectional top view along the plane A of the device in FIG. 3.
Figure 5:
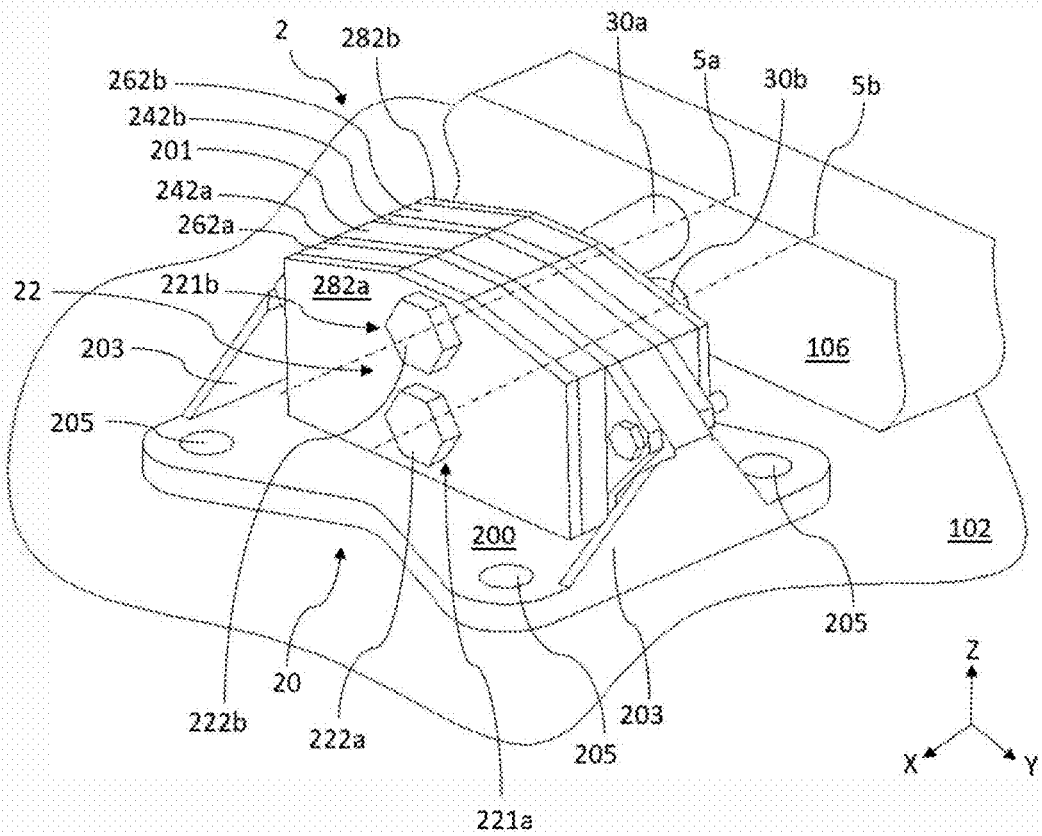
FIG. 5 is a perspective view of a first variant of the device in FIG. 3.
Figure 6:
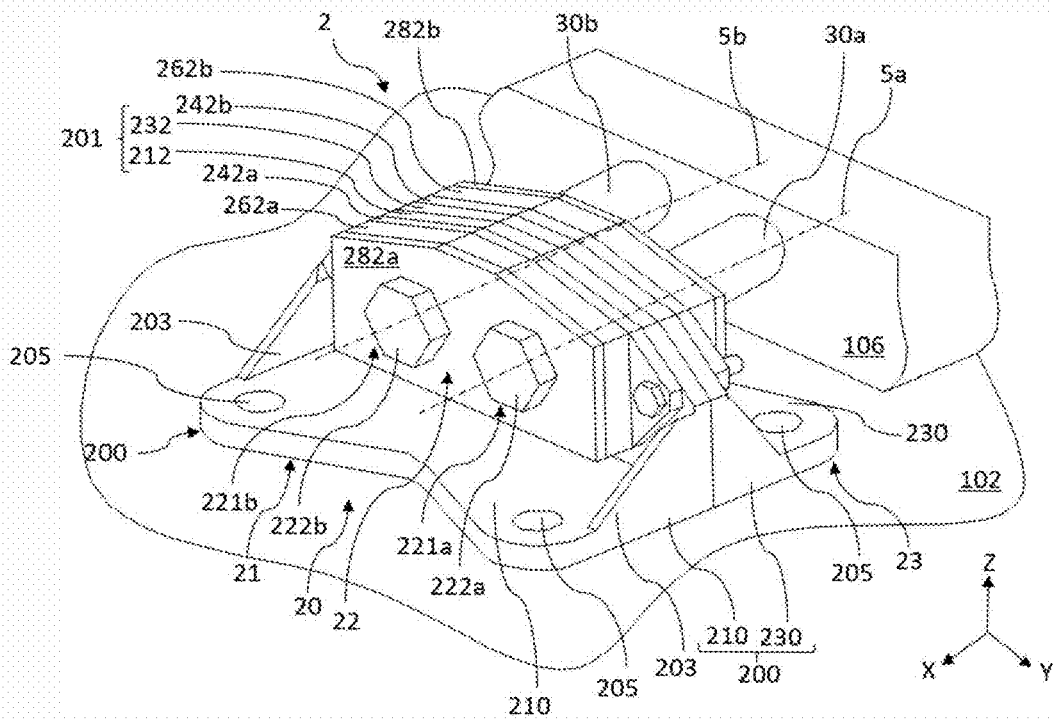
FIG. 6 is a perspective view of a second variant of the device in FIG. 3.
Figure 7:
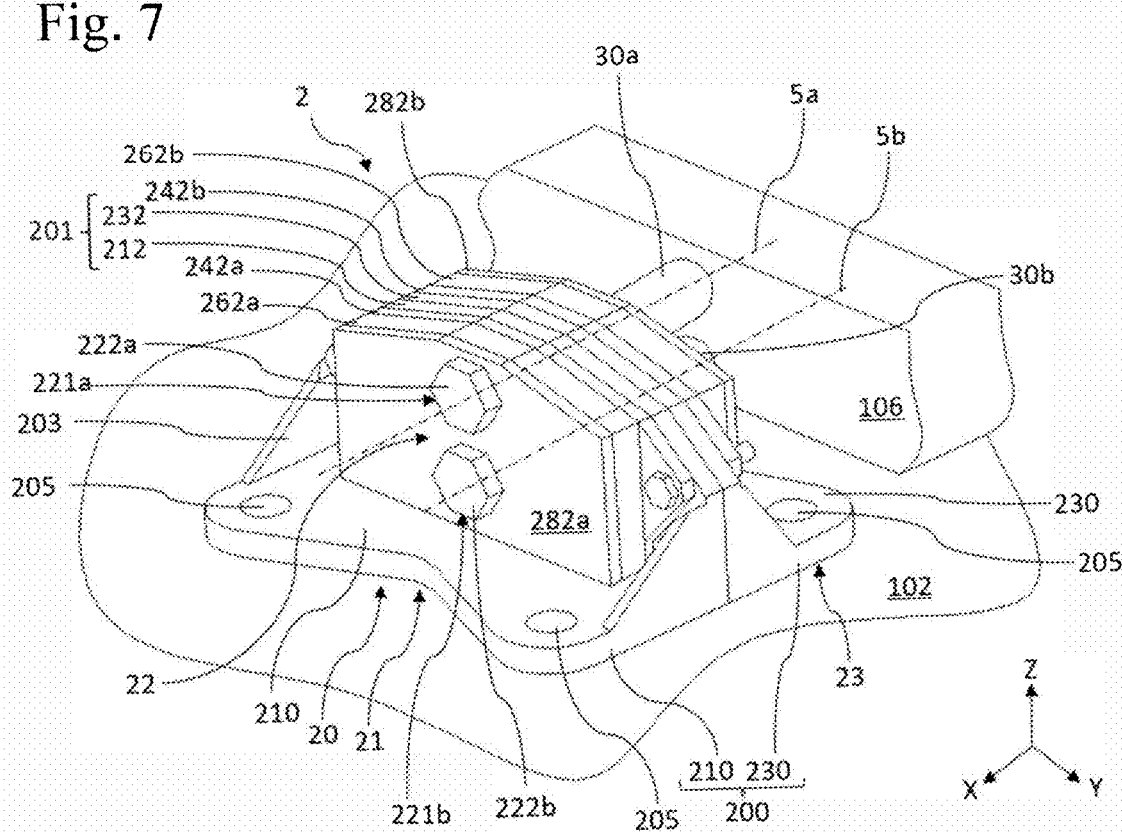
FIG. 7 is a perspective view of a third variant of the device in FIG. 3.

The principle of the invention consists of providing a device 2 for coupling a propulsion system 102 to the engine pylon 106 of an aircraft 10 implementing at least two fastening screws that are arranged adjacent to each other and therefore extend parallel to each other. As described in greater detail hereinafter, the fastening screws can for example extend one alongside the other, in a plane substantially parallel to the horizontal plane XY (as illustrated in FIG. 3 to 5), or one above the other, in a plane substantially parallel to the vertical plane XZ (as illustrated in FIGS. 6 and 7). Other arrangements of the at least two fastening screws, not illustrated, can also be envisaged.

Implementing at least two adjacent fastening screws makes it possible to provide a solution in the event of the failure of the single fastening screw generally implemented. The risk of the complete loss of the device 2 for coupling the propulsion system 102 to the engine pylon 106 is therefore reduced. The arrangement of the fastenings screws one alongside the other or one above the other (or any other arrangement) can in particular be selected as a function of the direction of the prevailing forces to which the coupling device 2 will be subjected and/or as a function of the space available within the engine pylon 106 for fastening the propulsion system 102 thereto.

In addition, this solution makes it possible to provide multiple paths (via the different fastening screws) for transferring the forces generated by the propulsion system 102 to the engine pylon 106.

FIGS. 3 and 4 show a device 2 for coupling a propulsion system 102 to the engine pylon 106 of the aircraft 10 according to a main embodiment of the invention. Here, the device 2 is illustrated horizontally so that the elements can be described in relation to the orthonormal coordinate system X, Y, Z described above. It will clearly be understood that the device 2 can be arranged and oriented differently in order to adapt to the propulsion system 102 and engine pylon 106 to which the device is fastened. FIG. 4 illustrates a cross-sectional top view along the section plane A. The section plane A is a plane parallel to the horizontal plane XY passing through the axis of the first and second fastening screws described in greater detail hereinafter.

In this example, the device 2 for coupling a propulsion system 102 to the engine pylon 106 implements two fastening screws that are arranged side by side and extend parallel to each other. A larger number of fastening screws can be envisaged without departing from the scope of the invention.

In this example, the device 2 comprises a baseplate 20 substantially in the shape of an inverted T. This baseplate 20 comprises a substantially flat base 200, which in this illustration extends in a plane parallel to the horizontal plane XY. The base 200 is suitable for being fastened to the propulsion system 102 by fastening means such as threaded elements.

To this end, the base 200 has, in this example, holes 205 made at least in each corner of the base 200. The holes 205 are each suitable for receiving a fastening screw to allow a screw fastening. Other techniques for fastening the baseplate to the propulsion system can be envisaged, such as riveting or welding in particular.

The baseplate 20 comprises a first wall 201 that extends perpendicularly to the base 200, that is, in a plane parallel to the vertical plane YZ. The first wall 201 comprises a first bore 202*a* (here on the port side) and a second bore 202*b* (here on the starboard side), which extend respectively along a first longitudinal axis 5*a* and a second longitudinal axis 5*b* that are shown here substantially parallel to the base 200 of the baseplate 20, that is, in a plane parallel to the horizontal plane XY. In this example, the first and second bores 202*a*, 202*b* are adjacent and more particularly arranged one alongside the other (according to the orientation illustrated in this example).

The baseplate 20 can also comprise, as in this example, lateral reinforcing walls 203 extending between the base 200 and the first wall 201, on the lateral edges of the baseplate 20, so as to absorb the mechanical forces. In this example, the lateral walls 203 are triangular.

The device 2 also comprises a first sleeve 50*a* (here on the port side) and a second sleeve 50*b* (here on the starboard side). Here, the first and second sleeves 50*a*, 50*b* are similar and therefore each comprise a first portion 502*a* (here on the port side), 502*b* (here on the starboard side), at least part of which is respectively received in the first and second bores 202*a*, 202*b* of the baseplate 20. The first and second sleeves 50*a*, 50*b* each comprise a second portion 504*a* (here on the port side) and 504*b* (here on the starboard side), a first end of which extends from and in the continuation of the first portion 502*a*, 502*b* towards the engine pylon 106. As illustrated in FIG. 4, the free end of the second portion 504*a*, 504*b* is suitable for interacting with the engine pylon 106. More specifically, the free ends of the second portions 504*a*, 504*b* are each fitted into a recess, respectively a first recess 107*a* (here on the port side) and a second recess 107*b* (here on the starboard side), made in the engine pylon 106.

In this example, the first portions 502*a*, 502*b* and second portions 504*a*, 504*b* are separated by a shoulder 508*a* (here on the port side) and 508*b* (here on the starboard side) respectively, making it possible to optimize the positioning of the sleeves 50*a*, 50*b*.

The first sleeve 50*a* further comprises a first central bore 506*a* (here on the port side) extending coaxially with the first longitudinal axis 5*a*, while the second sleeve 50*b* comprises a second central bore 506*b* (here on the starboard side) extending coaxially with the second longitudinal axis 5*b*. The first and second central bores 506*a*, 506*b* are suitable for respectively receiving a first fastening screw 221*a* (here on the port side) and a second fastening screw 221*b* (here on the starboard side) described below.

The device 2 comprises fastening means 22 that make it possible to fasten the device 2 to the engine pylon 106. To this end, the fastening means 22 comprise a first nut 220*a* (here on the port side) and a second nut 220*b* (here on the starboard side) rigidly connected to the engine pylon 106 and a first fastening screw 221*a* (here on the port side) and a second fastening screw 221*b* (here on the starboard side). In this example, the first and second nuts 220*a*, 220*b* rigidly connected to the engine pylon 106 are captive, but any other type of nut that can be rigidly connected to the engine pylon can be implemented. An assembly clearance is provided between the free ends of the second portions 504*a*, 504*b* of the sleeves 50*a*, 50*b* and the first and second nuts 220*a*, 220*b*, so as to allow the deformation of the pads described hereinafter on the tightening of the first and second fastenings screws 221*a*, 221*b* and so as to allow the compression of the spacer 30 between the second rear flange 282*b* and the engine pylon 106.

The first and second fastening screws 221*a*, 221*b* respectively comprise a first fastening head 222*a* (here on the port side) and a second fastening head 222*b* (here on the starboard side) arranged at the opposite end from the engine pylon 106 and bearing against a second front flange 282*a* (described below). The first and second fastening screws 221*a* and 221*b* respectively comprise a first threaded shank 223*a* (here on the port side) and a second threaded shank 223*b* (here on the starboard side). The first threaded shank 223*a* extends from the first fastening head 222*a* along the first longitudinal axis 5*a*, while the second threaded shank 223*b* extends from the second fastening head 222*b* along the second longitudinal axis 5*b*.

The first and second threaded shanks 223*a*, 223*b* are respectively fitted through the first and second central bores 506*a*, 506*b* of the first and second sleeves 50*a*, 50*b*. The first and second threaded shanks 223a, 223b each have a length greater than the length of the first and second sleeves 50a, 50b so that they can be screwed respectively into the first and second nuts 220a, 220b rigidly connected to the engine pylon 106. The sleeves 50a, 50b make it possible transfer the shear forces generated by the propulsion system 102 to the engine pylon 106, in particular via the fastening means 22.

This particular arrangement of the fastening screws 221a, 221b one alongside the other, that is parallel to each other in a plane parallel to the horizontal plane XY, makes it possible to provide a solution in the event of the failure of one of the fastening screws. Arranging the fastening screws 221a, 221b adjacent and parallel to each other in a plane parallel to the horizontal plane XY makes it possible to provide a device 2 that is particularly capable of withstanding the forces generated by the propulsion system 102 having a prevailing direction along the Y axis, by making it possible to absorb moment Mz.

The device 2 further comprises a pair of first flanges comprising a first front flange 242a and a first rear flange 242b. The first front and rear flanges 242a, 242b are respectively fastened on either side of the first wall 201 of the baseplate 20. In this example, the first front and rear flanges 242a, 242b are fastened to the first wall 201 using threaded elements situated in the vicinity of the lateral edges of the first wall 201. However, it will be understood that other fastening means can be envisaged without departing from the scope of the invention.

The first front flange 242a comprises a third bore 244a (here on the port side) and a fourth bore 244a' (here on the starboard side) extending respectively coaxially with the first longitudinal axis 5a and the second longitudinal axis 5b. The first rear flange 242b comprises a fifth bore 244b (here on the port side) and a sixth bore 244b' (here on the starboard side) extending respectively coaxially with the first longitudinal axis 5a and the second longitudinal axis 5b.

The dimensions of these bores 244a, 244b and 244a', 244b' are configured to allow them to receive the first portion 502a of the sleeve 50a and the first portion 502b of the sleeve 50b respectively. In this example, a radial assembly clearance is provided between the bores 244a, 244a', 244b, 244b' and the first portions 502a, 502b of the sleeves 50a, 50b, in order to allow the deformation of the pads (described below) up to a predetermined load level.

The device 2 comprises at least one pair of pads that allow the predetermined deformation of the device 2 in order to at least partially absorb the forces generated by the propulsion system 102. Implementing these pads makes it possible to obtain a "flexible mount".

In this example, the device 2 comprises two pads, namely a front pad 262a and a rear pad 262b. The front and rear pads 262a, 262b are arranged respectively bearing against the first front flange 242a and the first rear flange 242b.

The front pad 262a comprises a seventh bore 264a (here on the port side) and an eighth bore 264a' (here on the starboard side) extending respectively coaxially with the first longitudinal axis 5a and the second longitudinal axis 5b. The rear pad 262b comprises a ninth bore 264b (here on the port side) and a tenth bore 264b' (here on the starboard side) extending respectively coaxially with the first longitudinal axis 5a and the second longitudinal axis 5b.

The dimensions of these bores 264a, 264b and 264a' and 264b' are configured to allow them to receive the first portion 502a of the first sleeve 50a and the first portion 502b of the second sleeve 50b respectively. In this example, a radial assembly clearance is provided between the bores 264a, 264a', 264b, 264b' and the first portions 502a, 502b of the sleeves 50a, 50b, in order to allow the deformation of the pads up to a predetermined load level. In this example, the pads 262a, 262b are made from an elastomer the elasticity of which can be selected as a function of the maximum deformation desired, for example.

The device 2 further comprises a pair of second flanges comprising a second front flange 282a and a second rear flange 282b. The second front and rear flanges 282a, 282b are respectively arranged on either side of the first wall 201 of the baseplate 20. More specifically, the second front and rear flanges 282a, 282b respectively bear against the front and rear pads 262a, 262b so that the front pad 262a is clamped between the first front flange 242a and the second front flange 282a, and the rear pad 262b is clamped between the first rear flange 242b and the second rear flange 282b.

The second front flange 282a comprises an eleventh bore 284a (here on the port side) and a twelfth bore 284a' (here on the starboard side) extending respectively coaxially with the first longitudinal axis 5a and the second longitudinal axis 5b. The second rear flange 282b comprises a thirteenth bore 284b (here on the port side) and a fourteenth bore 284b' (here on the starboard side) extending respectively coaxially with the first longitudinal axis 5a and the second longitudinal axis 5b.

The dimensions of these bores 284a, 284b and 284a' and 284b' are configured to allow them to receive the first portion 502a of the first sleeve 50a and the first portion 502b of the second sleeve 50b respectively. In this example, no radial assembly clearance is provided between the bores 284a, 284a', 284b, 284b' and the first portions 502a, 502b of the sleeves 50a, 50b in order to allow conjoint radial movement between the sleeves 50a, 50b and the second front and rear flanges 282a, 282b. In particular, the first and second parts 21, 22 of the baseplate move relative to the sleeves 50a and 50b and relative to the second front and rear flanges 282a, 282b due to the deformation of the pads 262a, 262b. The sleeves 50a, 50b drive the second front and rear flanges 282a, 282b, which in turn cause the deformation of the pads 262a, 262b.

The second front and rear flanges 282a, 282b each comprise, on their faces 287a, 287b that are facing each other when the device 2 is assembled, that is their faces in contact with a pad, first and second cavities 288a, 288a' and third and fourth cavities 288b, 288b'. More specifically, the second front flange 282a comprises a first cavity 288a (here on the port side) made on the face 287a, making it possible to receive the free end of the first portion 502a of the first sleeve 50a, and a second cavity 288a' (here on the starboard side) made on the face 287a, making it possible to receive the free end of the first portion 502b of the second sleeve 50b. In this example, a radial assembly clearance is provided between the cavities 288a, 288a' and the first portions 502a, 502b of the sleeves 50a, 50b, in order to allow the deformation of the pads 262a, 262b on the tightening of the first fastening screws 221a, 221b.

The second rear flange 282b comprises a third cavity 288b (here on the port side) made on the face 287b, making it possible to receive the shoulder 508a separating the first and second portions 502a, 504a of the first sleeve 50a. The second rear flange 282b comprises a fourth cavity 288b' (here on the starboard side) made on the face 287b, making it possible to receive the shoulder 508b separating the first and second portions 502b, 504b of the second sleeve 50b.

The device 2 also comprises, for each sleeve 50a and 50b, a spacer 30a, 30b suitable for being arranged between the second rear flange 282b and the engine pylon 106, and for bearing against the second rear flange 282b and the engine pylon 106 when the device 2 is assembled. In this example, a single spacer 30a, 30b is implemented for each sleeve 50a and 50b. When the first and second fastening screws 221a, 221b are tightened, the spacers 30a, 30b are therefore compressed between the second rear flange 282b and the engine pylon 106.

The first spacer 30a (here on the port side) comprises a third central bore 32a extending coaxially with the first longitudinal axis 5a and the second spacer 30b (here on the starboard side) comprises a fourth central bore 32b extending coaxially with the second longitudinal axis 5b. The dimensions of the third and fourth central bores 32a, 32b are configured to allow them to receive the second portion 504a of the first sleeve 50a and the second portion 504b of the second sleeve 50b respectively. More specifically, the first spacer 30a is fitted onto the second portion 504a of the first sleeve 50a and therefore extends around the second portion 504a of said first sleeve 50a, while the second spacer 30b is fitted onto the second portion 504b of the second sleeve 50b and therefore extends around the second portion 504b of said second sleeve 50b.

The first portion 502a of the first sleeve 50a is therefore fitted through the third and fifth bores 244a, 244b of the first flanges 242a, 242b, through the seventh and ninth bores 264a, 264b of the pads 262a, 262b, and through the eleventh and thirteenth bores 284a, 284b of the second flanges 282a, 282b.

In addition, the first fastening head 222a of the first fastening screw 221a bears against the second front flange 282a and the first threaded shank 223a of the first fastening screw 221a is fitted through the first central bore 506a of the first sleeve 50a in order to be screwed to the first nut 220a rigidly connected to the engine pylon 106.

Likewise, the first portion 502b of the second sleeve 50b is therefore fitted through the fourth and sixth bores 244a', 244b' of the first flanges 242a, 242b, through the eighth and tenth bores 264a', 264b' of the pads 262a, 262b, and through the twelfth and fourteenth bores 284a', 284b' of the second flanges 282a, 282b.

In addition, the second fastening head 222b of the second fastening screw 221b bears against the second front flange 282a and the second threaded shank 223b of the second fastening screw 221b is fitted through the second central bore 506b of the second sleeve 50b in order to be screwed to the second nut 220b rigidly connected to the engine pylon 106.

Implementing the spacers 30a, 30b and the second flanges 282a, 282b therefore makes it possible, on the tightening of the first and second fastening screws 221a, 221b, to clamp the elements of the device 2 together.

The device 2 can optionally implement a first protective cylinder 60a and a second protective cylinder 60b that are respectively fitted onto at least part of the first portion 502a of the first sleeve 50a and onto at least part of the first portion 502b of the second sleeve 50b. The cylinders 60a, 60b make it possible to protect the sleeves 50a, 50b from any contact and friction between them and the baseplate 20 on the deformation of the pads 262a, 262b.

In a first variant of the main exemplary embodiment, and as illustrated in FIG. 5, the adjacent first and second fastening screws 221a, 221b are no longer arranged one alongside the other, but one above the other. In other words, in this variant, the first and second longitudinal axes 5a, 5b are arranged parallel to each other in a plane generally perpendicular to the base 200 of the baseplate 20, that is, in a plane generally parallel to the vertical plane XZ. This particular arrangement of the fastening screws 221a, 221b one above the other (in the orientation illustrated) makes it possible to provide a solution in the event of the failure of one of the fastening screws. Arranging the fastening screws 221a, 221b adjacent and parallel to each other in a plane parallel to the vertical plane XZ makes it possible to provide a device 2 that is particularly capable of withstanding the forces generated by the propulsion system 102 having a prevailing direction along the Z axis, by making it possible to absorb moment My.

In this variant, the elements forming the device 2 are identical (with the exception of the arrangement of the first and second longitudinal axes 5a, 5b) and are not therefore described again. It will clearly be understood that the arrangement of the different bores of the device 2 is adapted to the arrangement of the first and second longitudinal axes 5a, 5b.

In this example, the device 2 for coupling a propulsion system 102 to the engine pylon 106 implements two fastening screws that are arranged one above the other and extend parallel to each other. A larger number of fastening screws can be envisaged without departing from the scope of the invention.

According to third and fourth variants, illustrated in FIGS. 6 and 7 respectively and compatible with the examples described above, the device 2 implements a solution in the event of the failure of the baseplate 20 (such as a crack in the base 200, for example). To this end, the baseplate 20 is divided so that it comprises first and second parts 21, 23 of the baseplate 20. As a result, if one of the first or second parts 21, 22 of the baseplate 20 fails, the other part of the baseplate ensures that the propulsion system 102 continues to be coupled to the engine pylon 106. The risk of the complete loss of the device 2 for coupling the propulsion system 102 to the engine pylon 106 is therefore reduced. In addition, this solution makes it possible to provide multiple paths (via the first and second parts of the baseplate) for transferring the forces generated by the propulsion system 102 to the engine pylon 106.

More specifically, each of the first and second parts 21, 23 is in the shape of an L the vertical portions of which are placed against each other on assembly of the device 2. The first part 21 comprises a first base wall 210 extending in a plane parallel to the horizontal plane XY from which extends perpendicularly a second wall 212, which therefore extends in a plane parallel to the vertical plane YZ. The second wall 212 comprises fifteenth and sixteenth bores (not visible in the figures) respectively extending coaxially with the first longitudinal axis 5a and the second longitudinal axis 5b.

The second part 23 of the baseplate 20 comprises a second base wall 230 extending in a plane parallel to the horizontal plane XY from which extends perpendicularly a third wall 232, which therefore extends in a plane parallel to the vertical plane YZ. The third wall 232 comprises seventeenth and eighteenth bores (not visible in the figures) extending respectively coaxially with the first longitudinal axis 5a and the second longitudinal axis 5b.

The first and second parts 21, 23 of the baseplate 20 are arranged bearing against each other so that the second wall 212 and the third wall 232 are placed against each other and together form the first wall 201 of the baseplate 20, the first base wall 210 and the second base wall 230 together form the base 200 of the baseplate 20, the fifteenth and seventeenth bores together form the first bore 202a of the baseplate 20, and the sixteenth and eighteenth bores together form the second bore 202b of the baseplate 20.

It will therefore be understood that this variant, which implements a baseplate 20 comprising first and second parts 21, 23 of the baseplate, can be used regardless of the arrangement of the fastening screws, such as for example one alongside the other according to FIG. 6, one above the other according to FIG. 7, or any other arrangement not illustrated.

Figure 8:
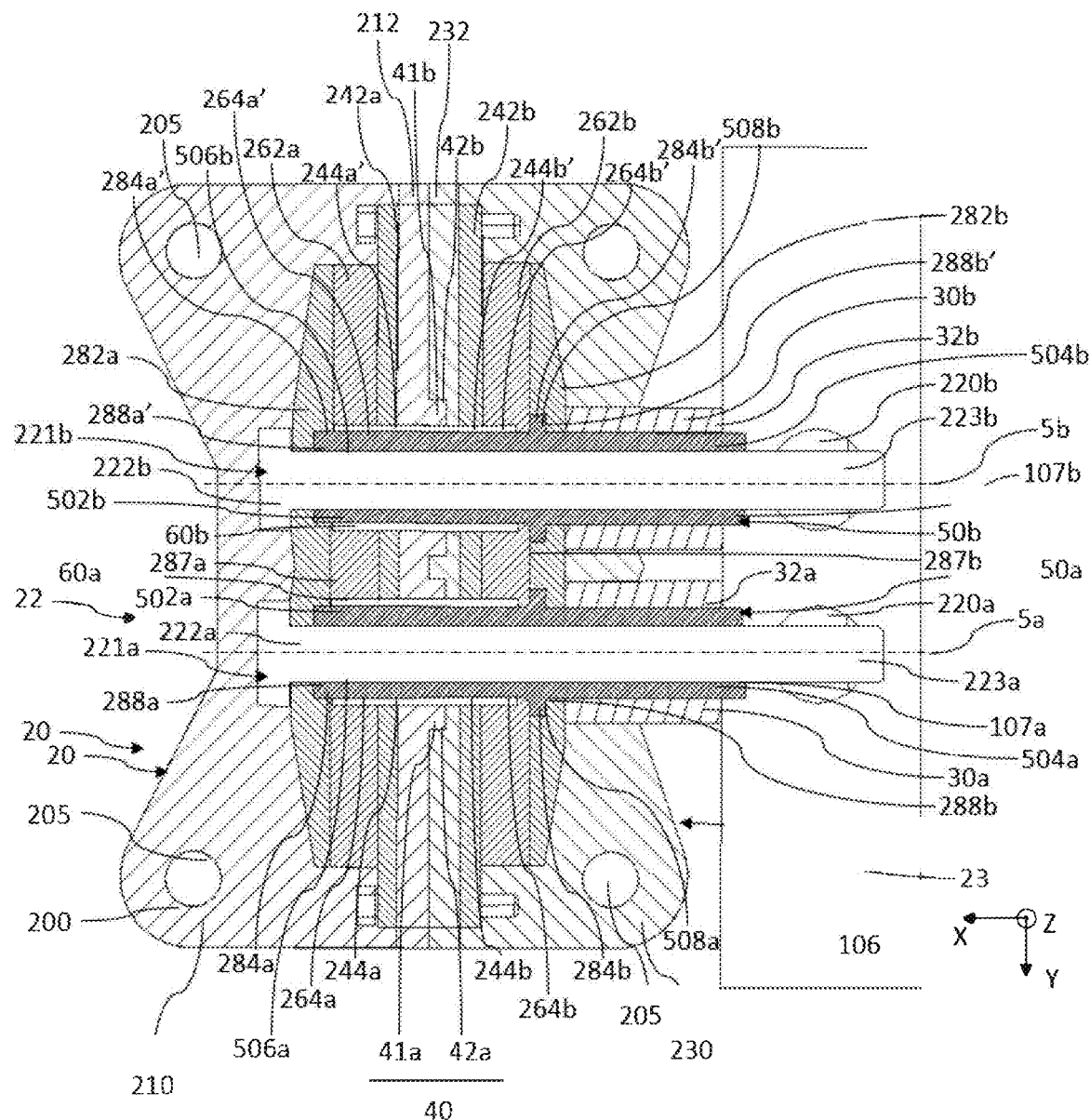
FIG. 8 is a cross-sectional top view along the plane A of another variant of the device in FIG. 3.

In another variant, illustrated in FIG. 8, it can be envisaged that the baseplate 20 comprising two parts 21, 23 further comprises means 40 for centering the first and second parts 21, 23 of the baseplate 20 relative to each other with respect to the direction X, and more specifically with respect to the first and second longitudinal axes 5a, 5b. These centering means 40 make it possible to facilitate the positioning of the first and second parts 21, 23 of the baseplate 20 relative to each other and the assembly of the different elements of the device 2. The centering means 40 also make it possible to improve the holding of the first and second parts 21, 23 of the baseplate 20 relative to each other, for example on the failure of one of the first and second parts 21, 23 of the baseplate 20.

For example, such centering means 40 can comprise a first male cylinder 41a and a second male cylinder 41b extending respectively coaxially with the first longitudinal axis 5a and the second longitudinal axis 5b. These first and second male cylinders 41a, 41b are borne by and protrude from a first contact face of the part 21 or the part 22 of the baseplate 20. Each of the first and second male cylinders 41a, 41b is suitable for interacting respectively with a first female cylindrical recess 42a and a corresponding second female cylindrical recess 42b extending respectively coaxially with the first longitudinal axis 5a and the second longitudinal axis 5b. The first and second female cylindrical recesses 42a, 42b are made in a second contact face of the other of the parts 21, 22. The first and second faces are arranged facing each other when the first and second parts 21, 23 of the baseplate 20 are assembled.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for coupling a propulsion system to an engine pylon of an aircraft, said device comprising:
   a baseplate in a shape of an inverted T, said baseplate comprising a base configured to be fastened to said propulsion system and a first wall extending substantially perpendicularly to said base, said first wall comprising a first bore and a second bore extending, respectively, along a first longitudinal axis and a second longitudinal axis that are parallel to each other;
   a first sleeve and a second sleeve that are tubular, each comprising a first portion fitted respectively through said first bore and said second bore, said first and second sleeves each comprising a second portion a first end of which extends in a continuation of said first portion towards said engine pylon and a second end of which is configured to interact said engine pylon, said first sleeve comprising a first central bore coaxial with said first longitudinal axis and said second sleeve comprising a second central bore coaxial with said second longitudinal axis;
   fastening means comprising a first nut and a second nut configured to be rigidly connected to said engine pylon, a first fastening screw comprising a first fastening head from which extends a first threaded shank, said first threaded shank being fitted through said first central bore and being screwed to said first nut, and a second fastening screw comprising a second fastening head from which extends a second threaded shank, said second threaded shank being fitted through said second central bore and being screwed to said second nut;
   a second front flange and a second rear flange, said second front and rear flanges being arranged respectively on either side of said first wall, said second front flange comprising an eleventh bore and a twelfth bore extending respectively coaxially with said first and second longitudinal axes, said second rear flange comprising a thirteenth bore and a fourteenth bore extending respectively coaxially with said first and second longitudinal axes;
   a first spacer and a second spacer suitable configured to be arranged between said second rear flange and said engine pylon, said first spacer comprising a third central bore coaxial with said first longitudinal axis so that said first spacer is fitted onto said second portion of said first sleeve, and said second spacer comprising a fourth central bore coaxial with said second longitudinal axis so that said second spacer is fitted onto said second portion of said second sleeve;
   wherein said first portion of said first sleeve is fitted through said eleventh and thirteenth bores of said second flanges;
   wherein said first portion of said second sleeve is fitted through said twelfth and fourteenth bores of said second flanges;
   wherein each fastening head bears against said second front flange.

2. The device according to claim 1, wherein said first longitudinal axis and said second longitudinal axis extend parallel to each other in a plane generally parallel to said base.

3. The device according to claim 1, wherein said first longitudinal axis and said second longitudinal axis extend parallel to each other in a plane generally perpendicular to said base.

4. The device according to claim 1, wherein said baseplate comprises a first part and a second part of the baseplate, each of said first and second parts being L-shaped, wherein said first part comprises a first base wall from which extends perpendicularly a second wall comprising a fifteenth bore and a sixteenth bore extending respectively coaxially with said first and second longitudinal axes, and said second part comprises a second base wall from which extends perpendicularly a third wall comprising a seventeenth bore and an eighteenth bore extending respectively coaxially with said first and second longitudinal axes,
   said first and second parts of the baseplate being placed against each other so that said second wall and said third wall together form said first wall of said baseplate, said first and second base walls together form said base of said baseplate, and said fifteenth and seventeenth bores together form said first bore and said sixteenth and eighteenth bores together form said second bore.

5. The device according to claim 4, further comprising: means for centering said first and second parts of the baseplate relative to each other along said longitudinal axes.

6. The device according to claim 5, wherein said centering means comprise a first male cylinder coaxial with said first longitudinal axis and a second male cylinder coaxial with said second longitudinal axis, said first and second male cylinders protruding from a first contact face of said second wall, or of said third wall respectively, and a first cylindrical recess coaxial with said first longitudinal axis and a second cylindrical recess coaxial with said second longitudinal axis for respectively receiving said first male cylinder and second male cylinder, said first and second cylindrical recesses being made in a second contact face of said third wall, or of said second wall respectively, said first and second contact faces being arranged facing each other when said first and second parts of the baseplate are assembled.

7. The device according to claim 1, further comprising: a first front flange and a first rear flange, said first front and rear flanges being fastened respectively on either side of said first wall, said first front flange comprising a third bore and a fourth bore extending respectively coaxially with said first and second longitudinal axes, said first rear flange comprising a fifth bore and a sixth bore extending respectively coaxially with said first and second longitudinal axes; and a front pad and a rear pad that are arranged respectively against said first front flange and against said first rear flange, said front pad comprising a seventh bore and an eighth bore extending respectively coaxially with said first and second longitudinal axes, said rear pad comprising a ninth bore and a tenth bore extending respectively coaxially with said first and second longitudinal axes;

wherein said first portion of said first sleeve is fitted through said third and fifth bores of said first flanges and through said seventh and ninth bores, and wherein said first portion of said second sleeve is fitted through said fourth and sixth bores of said first flanges and through said eighth and tenth bores.

8. An aircraft comprising:
a propulsion system,
an engine pylon, and
the device according to claim 1, said propulsion system being coupled to the engine pylon by the device, wherein said baseplate is fastened to said propulsion system, and said first and second nuts are rigidly connected to said engine pylon.

* * * * *